UNITED STATES PATENT OFFICE.

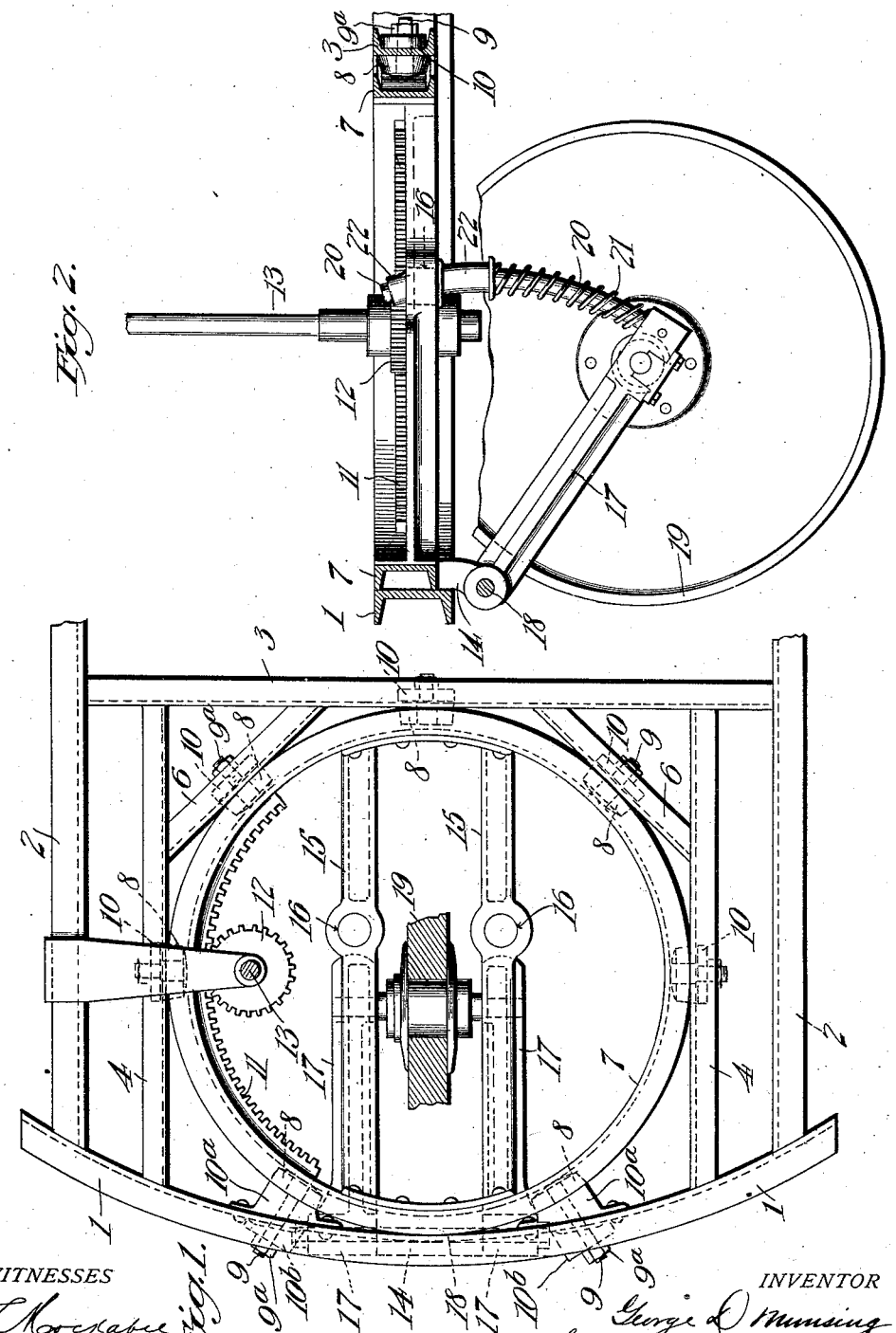
G. D. MUNSING.
TRACTOR CASTER WHEEL.
APPLICATION FILED AUG. 29, 1912.
1,079,604.
Patented Nov. 25, 1913.
WITNESSES
INVENTOR
George D. Munsing
by Hanworth, Attorney

GEORGE D. MUNSING, OF NEW YORK, N. Y., ASSIGNOR TO GEORGE D. MUNSING AND CHARLES E. INGERSOLL, OF NEW YORK, N. Y., COPARTNERS DOING BUSINESS AS MUNSING AND INGERSOLL.

TRACTOR CASTER-WHEEL.

1,079,604. Specification of Letters Patent. Patented Nov. 25, 1913.

Application filed August 29, 1912. Serial No. 717,770.

*To all whom it may concern:*

Be it known that I, GEORGE D. MUNSING, a citizen of the United States, residing at New York, in the county and State of New York, have invented certain new and useful Improvements in Tractor Caster-Wheels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to the front wheel or caster-wheel mechanism for tractors. In such vehicles, which usually have three wheels, it is necessary that the front wheel be readily turned in order to steer the vehicle properly, and by reason of the heavy loads that are drawn an especially strong arrangement of caster wheel mechanism is required.

The object of my invention is to so construct the caster wheel mechanism that the wheel support will not become distorted by twists imparted to the wheel while in operation, and thus prevent the distortion of the wheel supporting ring; to hinge and spring support the wheel, and to provide a simple but effective construction.

Referring to the drawings, in which like parts are similarly designated Figure 1 is a plan view embodying my invention and shown in relation to the front part of the frame or chassis of a tractor. Fig. 2 is a transverse central section of Fig. 1.

The front member 1 of the chassis is formed of a suitable rolled structural iron shape, herein shown as a channel, and is curved and connects the side members 2, 2, which are straight. Connected to the side members 2 is a cross member 3, and connected between this cross member and the front member are members 4, preferably but not necessarily parallel to the side members 2.

Across the rear corners formed between 4 and 3 are diagonal members 6. Within the area surrounded by the members 1, 4, 6 and 3, I place a circular channel 7 free to turn about its vertical axis and supported in operative relation to the frame members 1, 4, 6 and 3, by rollers 8 free to turn on pins 9 supported in castings 10 secured to the channel-shaped members. When the pins 9 are inclined to the member, as to the front member 1, the castings 10$^a$ are riveted or bolted to the member on one side, and an inclined or wedge-shaped element or washer 10$^b$ is placed inside the channel so as to form a bearing surface for the securing nut 9$^a$ perpendicular to the pin.

Secured to the ring 7 on the inside thereof and extending over a portion of its circumference is a circular rack 11 engaged by a gear wheel 12 at the end of the steering post 13, whereby the channel ring 7 may be turned on the rollers 8. Extending across the middle of ring 7 and secured thereto is a casting having ears 14 at each side thereof at the front end, and two parallel bars 15 each of which has a hole 16 therein. Between the ears 14 fits the end of the wheel fork 17 held in place by and having swinging movement on a bolt 18.

The caster wheel 19 is mounted in the fork 17, and the free ends of the fork each carry guide rods 20 curved to conform to the direction of swing of said free ends. These curved rods pass through the holes 16 and are each surrounded by springs 21 whose upper ends abut against nipples 22 that are either formed as part of the casting or are secured thereto. It will be noted that when in normal position, Fig. 2, the center of the wheel 19 is to the front of the center of the ring 7 and moves toward the rear as the springs 21 become compressed by reason of the load or otherwise.

In operation, by turning the steering post 13 and gear wheel 12 the rack 11 and ring 7 are turned, being supported by the rollers 8. By reason of the rollers operating in the channel of ring 7 this ring is prevented from tilting with relation to the chassis, and is readily turned. The guides 22 extend above and below the casting and prevent the fork 17 from twisting during the vertical movement of the wheel.

I claim—

1. A wheel mount, comprising a rotatable ring, a fork connected with the ring and arranged to swing toward and from the latter, a wheel journaled in the free end of the fork, parallel members extending across the ring and spaced apart to permit the wheel to swing between them, guide rods connected to the fork passing through holes in the parallel members, and springs interposed between the free ends of the fork and the parallel members.

2. The combination with a chassis, of a channel-shaped ring, rollers on the chassis engaging the channel of said ring, a casting extending across the middle of the ring having holes therein, a wheel fork pivoted to the casting, guide rods connected to the fork passing through said holes, and coil springs on the rods between the ends of the fork and casting.

In testimony that I claim the foregoing as my invention, I have signed my name in presence of two subscribing witnesses.

GEORGE D. MUNSING.

Witnesses:
GEORGE W. PERCY,
JAMES H. WESTCOTT.